(12) United States Patent
Nair (10) Patent No.: US 8,201,165 B2
(45) Date of Patent: Jun. 12, 2012

(54) VIRTUALIZING THE EXECUTION OF HOMOGENEOUS PARALLEL SYSTEMS ON HETEROGENEOUS MULTIPROCESSOR PLATFORMS

(75) Inventor: Ravi Nair, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1317 days.

(21) Appl. No.: 11/618,944

(22) Filed: Jan. 2, 2007

(65) Prior Publication Data

US 2008/0163206 A1 Jul. 3, 2008

(51) Int. Cl.
*G06F 9/455* (2006.01)

(52) U.S. Cl. ............................................................ 718/1
(58) Field of Classification Search ........................ 718/1
See application file for complete search history.

(56) References Cited

U.S. PATENT DOCUMENTS

| | | | |
|---|---|---|---|
| 4,979,106 A * | 12/1990 | Schneider ........................ 713/1 |
| 5,301,324 A * | 4/1994 | Dewey et al. ................. 718/105 |
| 5,805,790 A * | 9/1998 | Nota et al. ....................... 714/10 |
| 6,986,066 B2 | 1/2006 | Morrow et al. |
| 7,693,983 B1 * | 4/2010 | Gupta et al. ................... 709/224 |
| 2002/0156824 A1 * | 10/2002 | Armstrong et al. ........... 709/104 |
| 2003/0217088 A1 * | 11/2003 | Takamoto ......................... 709/1 |
| 2006/0242647 A1 * | 10/2006 | Kimbrel et al. ............... 718/104 |

OTHER PUBLICATIONS

R. Kumar et al.; "Single-ISA Heterogeneous Multi-Core Architectures for Multithreaded Workload Performance;" In Proceedings of the 31st International Symposium on Computer Architecture, Jun. 2004.

* cited by examiner

*Primary Examiner* — Jennifer To
*Assistant Examiner* — Blake Kumabe
(74) *Attorney, Agent, or Firm* — Cantor Colburn LLP; William J. Stock (57) ABSTRACT

A method of virtual processing includes running a virtual processor (1), which when the virtual processor (1) encounters a faulting instruction unmaps the virtual processor (1) from the physical processor (A), and generates a list of other of the physical processors that could execute the instruction. Then determines if one of the other of the physical processors in the list is currently idle, and when one of the other of the physical processors in the list is determined to be currently idle, maps the virtual processor (1) to a physical processor (B) which is the one of the other of the physical processors in the list that was determined to be currently idle.

10 Claims, 5 Drawing Sheets

VIRTUALIZING THE EXECUTION OF HOMOGENEOUS PARALLEL SYSTEMS ON HETEROGENEOUS MULTIPROCESSOR PLATFORMS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to homogeneous parallel systems, and particularly to the execution of a homogeneous parallel program on a heterogeneous set of processor cores.

2. Description of Background

Processor chips typically have multiple processor cores, each capable of running at a time one or more software program threads. The number of hardware threads that can be running simultaneously on the chip is the total number of cores multiplied by the multithreading capability of each core. Many such processors present to the software a homogeneous view of the hardware capability, with each hardware thread being capable of running any software thread, so that neither the application nor the operating system needs to be concerned about the specific allocation of processors to threads.

A typical program seldom uses all the resources of a processor simultaneously. Some never use significant portions of the processor, e.g. the floating point units or the multimedia vector units. Some programs use certain functions infrequently, and often not for significant portions of their execution time. The traditional ways to exploit this behavior is to disable the functionality that is not being used so that the power that would normally be expended in these units is saved. There is however still the problem that the user is required to pay the cost of a chip that includes all the functionality on the chip despite the fact that only a fraction of the functionality is used at any given time.

Thus there is a need for a design of a multiprocessor chip design that executes traditional single Instruction Set Architecture (ISA) parallel programs, in which the peak resources available on the chip match more closely the instantaneous resources that are needed by the programs running on the chip.

SUMMARY OF THE INVENTION

The shortcomings of the prior art are overcome and additional advantages are provided through the provision of a method (and storage medium that includes instructions for causing a computer to implement the method) of virtual processing. The method includes running a virtual processor (1), which when the virtual processor (1) encounters an instruction that is not implemented in a physical processor (A) results in an exception that is intercepted by a monitor. The virtual processor (1) is mapped to the physical processor (A). The virtual processor (1) is one of a plurality of virtual processors. The physical processor (A) is one of a plurality of non-identical physical processors. The method further includes unmapping the virtual processor (1) from the physical processor (A), and generating a list of other of the physical processors that could execute the instruction. The method also includes determining if one of the other of the physical processors in the list is currently idle, and when one of the other of the physical processors in the list is determined to be currently idle, mapping the virtual processor (1) to a physical processor (B) which is the one of the other of the physical processors in the list that was determined to be currently idle.

An alternate method (and storage medium that includes instructions for causing a computer to implement the method) of virtual processing includes interrupting operation of a plurality of virtual processors which are mapped to a plurality of non-identical physical processors. The method further includes collecting information about the virtual processors, and executing a matching algorithm, utilizing the information, to match the virtual processors to the physical processors. The method also includes unmapping each of the virtual processors that is running and that is not mapped to the physical processor assigned to the virtual processor by the matching algorithm, and mapping each of the virtual processors that is unmapped and that has been assigned one of the physical processors by the matching algorithm to the assigned one of the physical processors.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

As a result of the summarized invention, technically we have achieved a solution that provides for a multiprocessor chip design that executes traditional single-ISA parallel programs, in which the peak resources available on the chip match more closely the instantaneous resources that are needed by the programs running on the chip. This results in a saving of area and power, which are valuable commodities in a computer system.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
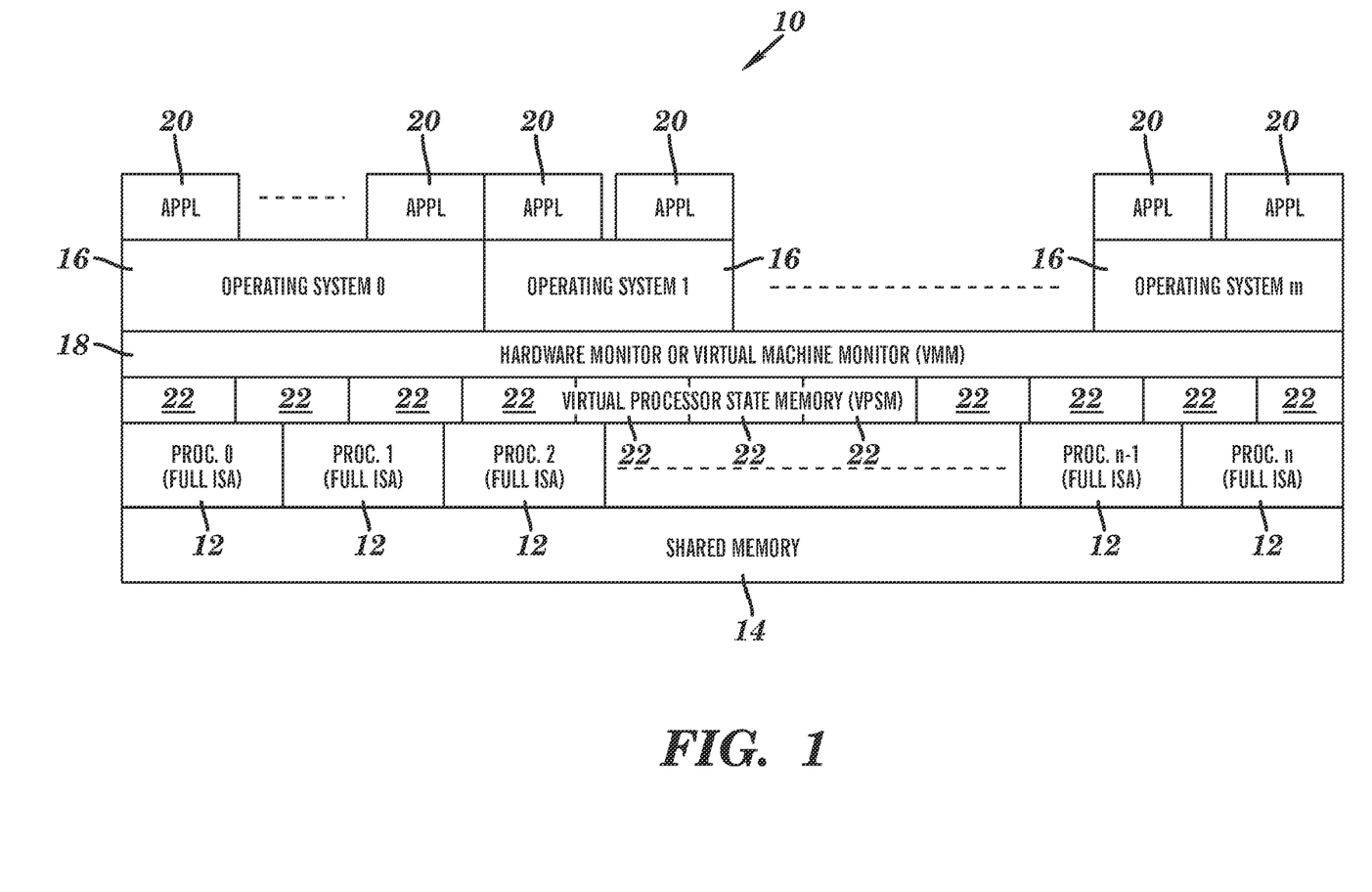
FIG. 1 illustrates one example of a traditional homogeneous multiprocessor system.

Turning now to the drawings in greater detail, it will be seen that in FIG. 1 there is a traditional shared-memory multiprocessor system 10. The system 10 has multiple identical processors 12 that access a shared memory 14. Each of the processors 12 executes the same set of instructions. A set of m operating systems 16 running on this complex of n processors 12 through the assistance of an interface 18 also known as a monitor. The monitor 18 functions to make the hardware appear to each operating system 16 to be another system, which may be a multiprocessor system different from the underlying hardware or even a uniprocessor system. Moreover, each operating system 16 may be provided with a view of the hardware different from that provided to the other operating systems 16 running on the system 10. Each operating system 16 runs on a virtual machine. The monitor 18 is software, though it can also be implemented partially or completely in hardware. Running on each operating system 16 are several applications 20.

Each virtual machine on the system 10 with its associated operating system runs on a set of virtual processors 22. A virtual processor is characterized by its state that is saved in one section of the Virtual Processor State Memory (VPSM). For a virtual processor to execute, its state needs to be loaded into the state registers of one of the physical processors 12. Its state is updated in the VPSM 22 only when a new virtual processor 22 needs to be executed on the physical processor 12.

Figure 2:
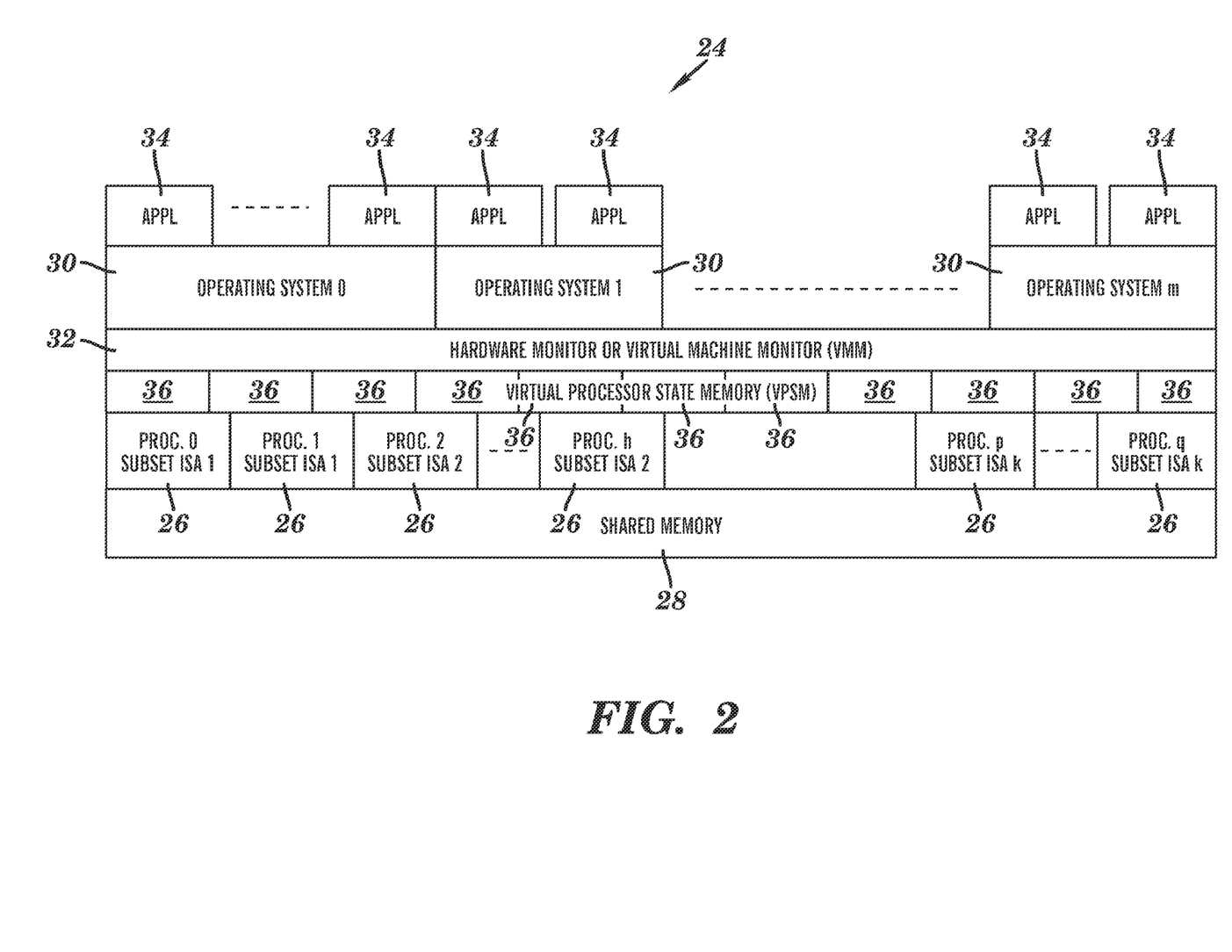
FIG. 2 illustrates one example of a heterogeneous multiprocessor system with each physical processor not implementing the full ISA expected by the software running on it.

Turning now to FIG. 2, a high-level view of a shared-memory multiprocessor system 24 of an embodiment of the invention is generally shown. The system 24 has multiple non-identical processors 26 that access a shared memory 28. A set of m operating systems 30 running on this complex of n processors 26 through the assistance of a monitor 32 (interface). The monitor 32 functions to make the hardware appear to each operating system 30 to be another system, which may be a multiprocessor system different from the underlying hardware or even a uniprocessor system. Moreover, each operating system 30 may be provided with a view of the hardware different from that provided to the other operating systems 3 running on the system 24. Each operating system 30 runs on a virtual machine. The monitor 32 is software, though it can also be implemented partially or completely in hardware. Running on each operating system 30 are several applications 34.

Each virtual machine (operating system 30) on the system 24 runs on a set of virtual processors 36. A virtual processor is characterized by its state that is saved in one section of the Virtual Processor State Memory (VPSM). For a virtual processor to execute, its state needs to be loaded into the state registers of one of the physical processors 26. Its state is updated in the VPSM 36 only when a new virtual processor 36 needs to be executed on the physical processor 26.

The underlying hardware is the same described above with reference to FIG. 1, but processors 26 are not identical as are the processors 12 in FIG. 1. Each processor 26 implements a subset of the Instruction Set Architecture (ISA) functionality as expected by the operating system 30. The ISA is the interface between the software intended to run on a computer, including its operating system and applications, and the machine that it is assumed to run on. The multiprocessor system 24, instead of having all the processors implement the full ISA (as in system 10), each individual processor 26 implements a subset of the ISA, but with every instruction in the ISA implemented by at least one processor 26 in the system 10. Different processors 26 may implement different subsets of the ISA with every function in the ISA being implemented by at least one processor 26 on the system. More specifically, processors 26 designated 0 and 1 implement one subset of the ISA, processors 26 designated 2 through h implement another subset of the ISA and so on.

Typically when a processor 12 of FIG. 1 implements a subset of the ISA, it cannot execute a set of the instructions in the ISA, or it may not have the resources to map some portions of the state of the virtual processor 22. If the processor 12 encounters an instruction that has not been implemented, it raises an unimplemented exception condition that is intercepted by the virtual machine monitor 18. When a virtual processor 22 is mapped to a physical processor 12, the portions of the state of the virtual processor 22 implemented on the physical processor 12 are transferred to the mapped processor 12. The unimplemented portions are retained in the corresponding section of the VPSM 22. When the virtual processor 22 is unmapped out of a physical processor 12, the changed portions of the state residing in the physical processor 12 are transferred to the appropriate locations in the VPSM 22.

Figure 3A:
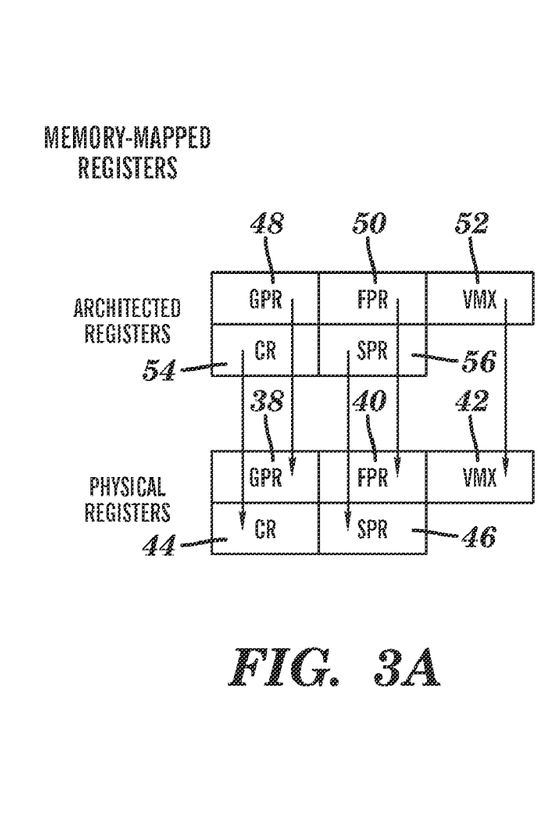
FIGS. 3A-C illustrate examples of mapping of ISA resources, when executing on a subset-ISA processor, the architected resources that are physically implemented are mapped to corresponding physical resources; the remaining resources are mapped to specific locations in special memory visible only to the monitor (hardware or VMM)
Figure 3B:
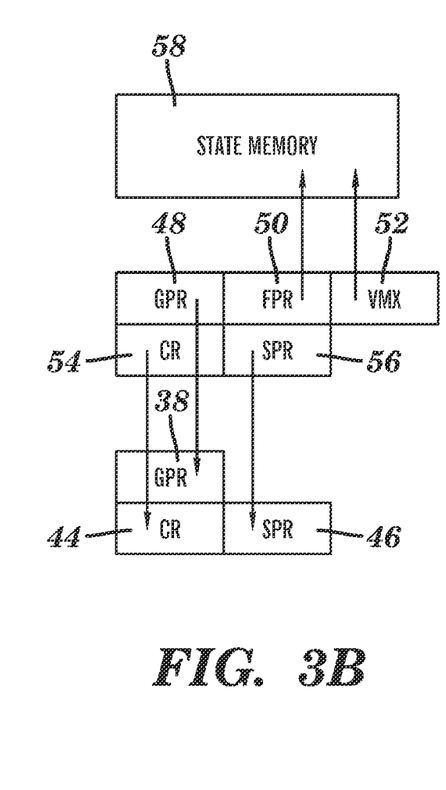
Figure 3C:
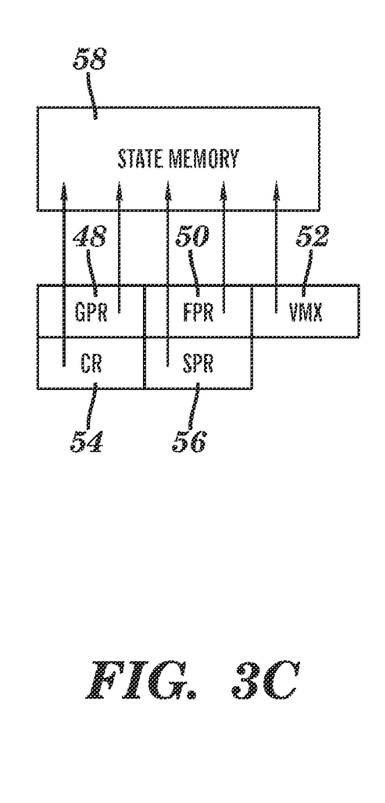

Returning now to FIG. 2 and turning to FIGS. 3A-C, each virtual processor 36 must have its full state available at all times. The physical processors 26 have physical registers that are mapped to architected registers of the virtual processors 36. Thus for example if the virtual processor 36 expects the PowerPC ISA, the state contained in the GPR (general purpose register), FPR (floating point register), VMX (a floating point and integer SIMD instruction set by IBM), CR (cache register), and SPR (special purpose register) registers constitute the state of the virtual processor 36. The physical registers include a GPR 38, FPR 40, VMX 42, CR 44, and SPR 46. The architected registers include a GPR 48, FPR 50, VMX 52, CR 54, and SPR 56.

In FIG. 3A, an example is illustrated where the physical processor 26 has all the resources expected by the virtual processor 36 in its hardware implementation. The mapping of the information between the physical processor 26 and virtual processor 36 is one-to-one. In FIG. 3B, an example is illustrated where the physical processor 26 does not implement the floating point and VMX functions. Hence it does not have resources corresponding to the FPR and VMX registers. The contents of these registers are therefore kept in distinct and identifiable locations of the VPSM in state memory 58. In FIG. 3C, an example is illustrated where the virtual processor 36 is idle and not mapped to any physical processor 26; its complete state is available only in the VPSM 36.

In the Table below, a mapping is shown, which is kept in memory of monitor 32. The Table shows the physical processor 26 currently assigned to a virtual processor 36. It will be noted, that all virtual processors 36 may not be mapped to physical processors 26 even when some physical processor 26 is idle because the available physical processor 26 may not be able to execute instructions required by the unmapped virtual processor 36.

TABLE

| Virtual Processor 1 | Physical Processor 2 |
| Virtual Processor 2 | Physical Processor 5 |
| Virtual Processor 3 | - not mapped - |
| Virtual Processor 4 | Physical Processor 3 |
| Virtual Processor 5 | Physical Processor 1 |

A running virtual processor 36 is one that changes its state in response to a sequence of one or more instructions. A running virtual processor 36 must be mapped to some physical processor 26. An idle virtual processor 36 may or may not be mapped to a physical processor 26. Thus a mapped virtual processor 36 may be running or idle. Typically an idle processor 36 is unmapped if there is another virtual processor 36 that is ready and can be mapped to that physical processor 26. The above Table shows a sample mapping of a virtual processor 36 to a physical processor 26. Each row in this Table consists of two fields, a field with the identity of the virtual processor 36 and a field indicating the identity of the physical processor 26 to which it is mapped. There is one row corresponding to each virtual processor 36, though not all virtual processors 36 may be mapped to a physical processor 26 as exemplified by row 3 of the Table.

Figure 4:
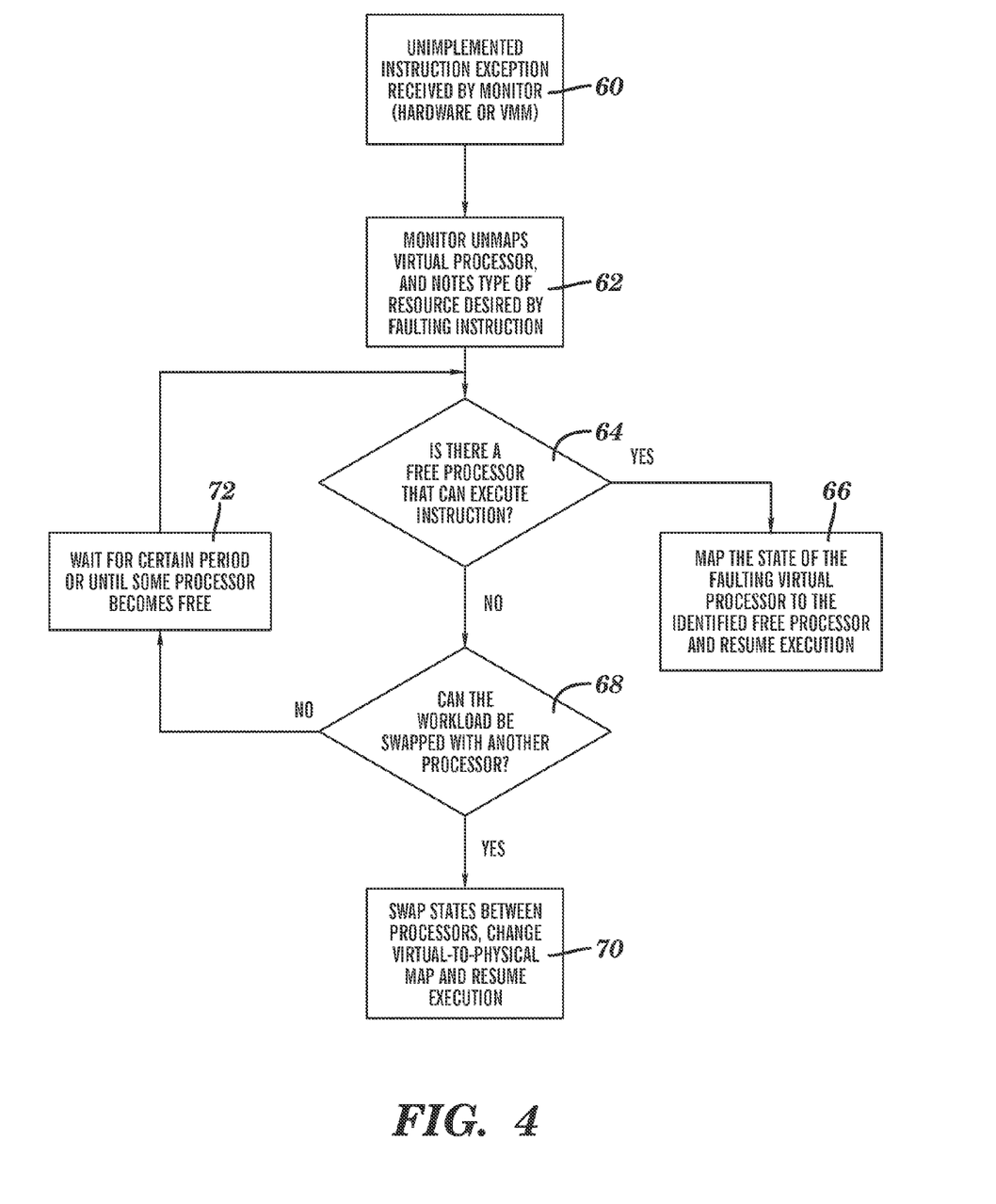
FIG. 4 illustrates one example of a flowchart showing the actions taken by the monitor when it receives an unimplemented instruction exception.

Turning now to FIG. 4, at a block 60 the monitor 32 when a running virtual processor 36 (which is one of the virtual processors 36 that is discussed as (1) here) encounters an instruction that is not implemented in the physical processor 26 (which is one of the physical processors 26 that is discussed as (A) here). Typically, such an instruction needs to access a part of the state that is not physically mapped but is in the VPSM. As indicated, such an instruction, hereafter referred to as the faulting instruction, causes an exception that is intercepted by the monitor 32. The information associated with the exception allows the monitor 32 to determine the nature of the instruction and the resources that the processor 26 expects to be physically mapped. At a block 62 the monitor 32 first unmaps the virtual processor (1) from the physical processor (A). As mentioned earlier, this process involves updating the state of the virtual processor (1) in the VPSM with the changes in the implemented portions of the state and changing its entry in the mapping table. The monitor 32 then uses information associated with the exception to determine the list of physical processors 26 that could execute the faulting instruction. There must be at least one physical processor 26 that can execute the instruction.

At a block 64 the monitor 32 then examines each of the eligible physical processors 26 to determine whether one of them is currently idle. If such a processor 26 is found, the monitor 32 (at a block 66) maps that virtual processor (1) to this physical processor 26 (which is one of the physical processors 26 that is discussed as (B) here). As mentioned earlier, mapping involves transferring implemented portions of the state of the virtual processor (1) to the physical registers of the physical processor (B), and changing the entry in the mapping table for this virtual processor (1). The virtual processor (1) is now ready to resume execution at the faulting instruction.

If no idle physical processor 26 can be found, the monitor 32 (at block 68) examines the list of eligible physical processors 26 for one, such as physical processor (C), that can continue its execution on physical processor (A). If such a processor 26 can be found, the virtual processor 36 running on it (which is one of the virtual processors 36 that is discussed as (2) here), is unmapped. At a block 70 the processor mapping is now swapped, with the virtual processor (1) mapped to the physical processor (C), and the virtual processor (2) mapped to the physical processor (A), and execution of both processors (A and B) are resumed.

If no such processor 26 can be found, the monitor 32 (at a block 72) waits until an eligible processor 26 becomes idle, unmaps its virtual processor 36 and then maps the faulting processor 26 to it. Instead of waiting until an eligible processor 26 becomes idle, the monitor 32 may also choose an eligible processor 26 to be pre-empted after it has been running for a predetermined amount of time.

The forgoing is sufficient to execute any program written for the full ISA, the performance of the system 24 depends on how often unimplemented instruction exceptions occur on the system 24. This can be minimized and the performance improved if the monitor 32 schedules virtual processors 36 to physical processors 26 based on knowledge of the workload running on the virtual processor 36.

Figure 5:
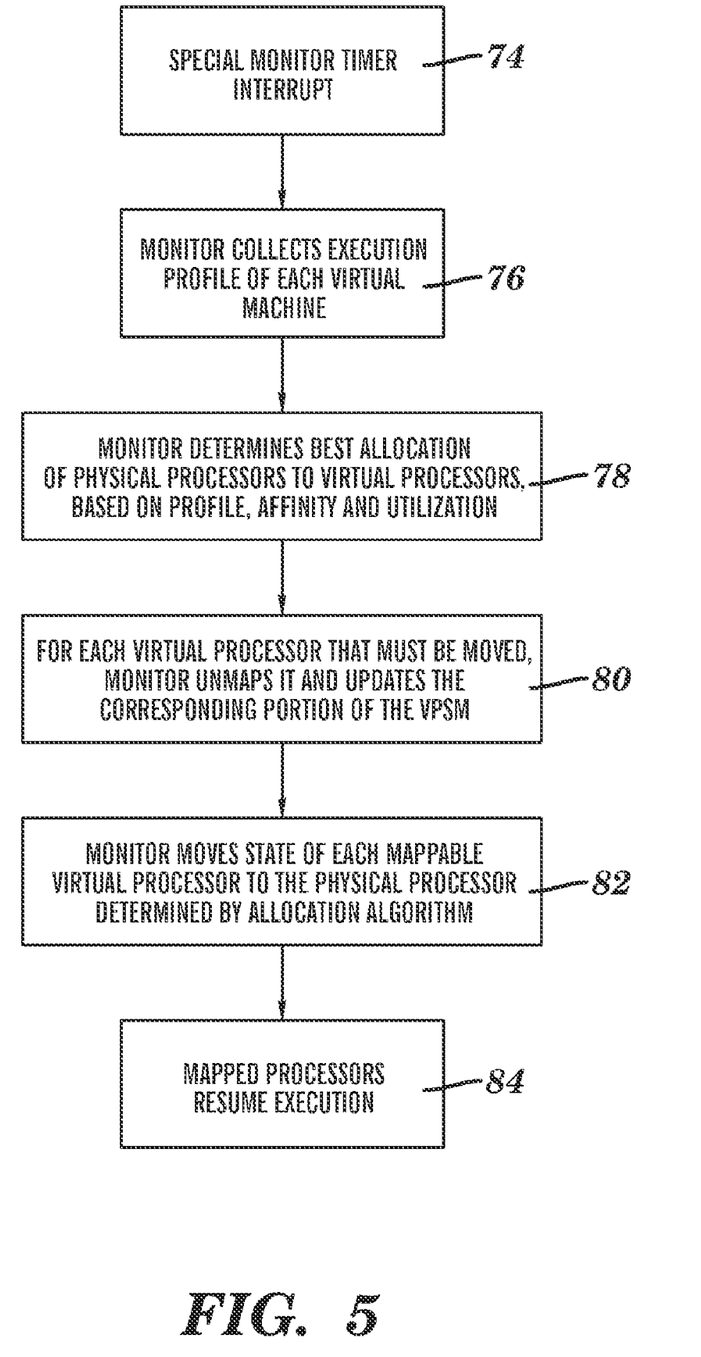
FIG. 5 illustrates one example of a flowchart illustrating periodic reassignment of processors, based on monitored characteristics of workload running in each virtual processor.

Turning now to FIG. 5, another exemplary embodiment is shown where the monitor 32 periodically remaps the virtual processors 36 based on the effectiveness of the current mapping. At a block 74 the monitor 32 sets up a timer to interrupt normal operation to allow for this periodic remapping. During the normal course of execution, the monitor 34 (at a block 76) collects information about each virtual processor 36 using either hardware or software instrumentation, e.g. performance counters. This information includes a profile of the type of instructions being executed on the virtual processor 36, the cache activity of the virtual processor 36, and its utilization of resources of the current processor 26. The profile gives an indication of the resource requirements of the virtual processor 36, the cache activity provides an indication of the affinity of the workload to the location of the data it is using, while the utilization provides an indication of the effectiveness of the mapping. These are merely exemplary, whereby other measures could also be used.

When a prescheduled timer interrupt occurs (block 74), the monitor 32 gathers the information (block 76) mentioned above for the running virtual processors 36 as well as saved information for unmapped virtual processors 36 that are ready-to-execute. Based on some mathematical function of these parameters, the monitor 32 (at a block 78) executes a matching algorithm that matches the chosen set of virtual processors 36 to the physical processors 26. At a block 80, the monitor 32 unmaps each running virtual processor 36 that is not on the physical processor 26 assigned to it by the matching algorithm. For each virtual processor 36 that is unmapped, but that has been assigned a physical processor 26 by the matching algorithm, the monitor 32 (at a block 82) maps the virtual processor 36 and allows it to resume execution (at a block 84).

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of virtual processing, comprising:
   running a virtual processor (1), which when the virtual processor (1) encounters an instruction that is not implemented in a physical processor (A) results in an exception that is intercepted by a monitor, the virtual processor (1) is mapped to the physical processor (A), the virtual processor (1) is one of a plurality of virtual processors, the physical processor (A) is one of a plurality of non-identical physical processors, each of the plurality of non-identical physical processors implementing a different subset of an instruction set architecture;
   unmapping the virtual processor (1) from the physical processor (A) responsive to intercepting the exception;
   generating a list of other of the physical processors that could execute the instruction;
   determine if one of the other of the physical processors in the list is currently idle; and
   when one of the other of the physical processors in the list is determined to be currently idle, mapping the virtual processor (1) to a physical processor (B) which is the one of the other of the physical processors in the list that was determined to be currently idle.

2. The method of virtual processing of claim 1 further comprising:
   when none of the other of the physical processors in the list is determined to be currently idle, determine if one of the other of the physical processors in the list can continue its execution on physical processor (A);
   when one of the other of the physical processors in the list can continue its execution on the physical processor (A), unmapping a virtual processor (2) from a physical processor (C) which is the one of the other of the physical processors in the list can continue its execution on the physical processor (A), the virtual processor (2) is one of the plurality of virtual processors and was mapped to the physical processor (C),
   mapping the virtual processor (1) to the physical processor (C), and
   mapping the virtual processor (2) to the physical processor (A); and
   when none of the other of the physical processors in the list can continue its execution on the physical processor (A),
   waiting until one of the other of the physical processors in the list can continue its execution on the physical processor (A),
   when one of the other of the physical processors in the list can continue its execution on the physical processor (A), unmapping a virtual processor (2) from a physical processor (C) which is the one of the other of the physical processors in the list can continue its execution on the physical processor (A), the virtual processor (2) is one of the plurality of virtual processors and was mapped with the physical processor (C),
   mapping the virtual processor (1) to the physical processor (C), and
   mapping the virtual processor (2) to the physical processor (A).

3. The method of virtual processing of claim 1, wherein the unmapping the virtual processor (1) from the physical processor (A) comprises:
   updating a state of the virtual processor (1) in a Virtual Processor State Memory with changes in implemented portions of the state and changing an entry in a mapping table for the virtual processor (1).

4. The method of virtual processing of claim 1, wherein the mapping the virtual processor (1) to this physical processor (B), comprises:
   transferring implemented portions of a state of the virtual processor (1) to physical registers of the physical processor (B) and changing an entry in a mapping table for the virtual processor (1).

5. A method of virtual processing, comprising:
   collecting information about a plurality of virtual processors while the virtual processors are executing normally, the information comprising a profile type of instruction being executed by the virtual processors, a cache activity of the virtual processors, and resource utilization of the virtual processors;
   receiving an interrupt signal, the interrupt signal initiated by a timer and causing the interruption of the operation of the plurality of virtual processors which are mapped to a plurality of non-identical physical processors, each of the plurality of non-identical physical processors implementing a different subset of an instruction set architecture;
   executing a matching algorithm, utilizing the information, to match the each of the plurality of virtual processors to the physical processors, responsive to the collecting;
   unmapping each of the virtual processors that is running and that is not mapped to the physical processor assigned to the virtual processor by the matching algorithm, responsive to the executing; and
   mapping each of the virtual processors that is unmapped and that has been assigned one of the physical processors by the matching algorithm to the assigned one of the physical processors.

6. A storage medium encoded with machine-readable computer program code for virtual processing, the storage medium comprising a program storage device, the program storage device including instructions for causing a computer to implement a method comprising:
   running a virtual processor (1), which when the virtual processor (1) encounters an instruction that is not implemented in a physical processor (A) results in an exception that is intercepted by a monitor, the virtual processor (1) is mapped to the physical processor (A), the virtual processor (1) is one of a plurality of virtual processors, the physical processor (A) is one of a plurality of non-identical physical processors, each of the plurality of non-identical physical processors implementing a different subset of an instruction set architecture;
   unmapping the virtual processor (1) from the physical processor (A) responsive to intercepting the exception;
   generating a list of other of the physical processors that could execute the instruction;
   determining if one of the other of the physical processors in the list is currently idle; and
   when one of the other of the physical processors in the list is determined to be currently idle, mapping the virtual processor (1) to a physical processor (B) which is the one of the other of the physical processors in the list that was determined to be currently idle.

7. The storage medium of claim 6, wherein the method further comprises:
   when none of the other of the physical processors in the list is determined to be currently idle, determine if one of the other of the physical processors in the list can continue its execution on physical processor (A);
   when one of the other of the physical processors in the list can continue its execution on the physical processor (A), unmapping a virtual processor (2) from a physical processor (C) which is the one of the other of the physical processors in the list can continue its execution on the physical processor (A), the virtual processor (2) is one of the plurality of virtual processors and was mapped to the physical processor (C), mapping the virtual processor (1) to the physical processor (C), and mapping the virtual processor (2) to the physical processor (A); and when none of the other of the physical processors in the list can continue its execution on the physical processor (A), waiting until one of the other of the physical processors in the list can continue its execution on the physical processor (A), when one of the other of the physical processors in the list can continue its execution on the physical processor (A), unmapping a virtual processor (2) from a physical processor (C) which is the one of the other of the physical processors in the list can continue its execution on the physical processor (A), the virtual processor (2) is one of the plurality of virtual processors and was mapped with the physical processor (C), mapping the virtual processor (1) to the physical processor (C), and mapping the virtual processor (2) to the physical processor (A).

8. The storage medium of claim 6, wherein the unmapping the virtual processor (1) from the physical processor (A) comprises:

updating a state of the virtual processor (1) in a Virtual Processor State Memory with changes in implemented portions of the state and changing an entry in a mapping table for the virtual processor (1).

9. The storage medium of claim 6, wherein the mapping the virtual processor (1) to this physical processor (B), comprises:

transferring implemented portions of a state of the virtual processor (1) to physical registers of the physical processor (B) and changing an entry in a mapping table for the virtual processor (1).

10. A storage medium encoded with machine-readable computer program code for virtual processing, the storage medium including instructions for causing a computer to implement a method comprising:

collecting information about the virtual processors, the information comprising a profile type of instruction being executed by the virtual processors, a cache activity of the virtual processors, and resource utilization of the virtual processors;

receiving an interrupt signal, the interrupt signal initiated by a timer and causing the interruption of the operation of the plurality of virtual processors which are mapped to a plurality of non-identical physical processors, each of the plurality of non-identical physical processors implementing a different subset of an instruction set architecture;

executing a matching algorithm, utilizing the information, to match each of the plurality of virtual processors to the physical processors, responsive to the collecting;

unmapping each of the virtual processors that is running and that is not mapped to the physical processor assigned to the virtual processor by the matching algorithm, responsive to the executing; and mapping each of the virtual processors that is unmapped and that has been assigned one of the physical processors by the matching algorithm to the assigned one of the physical processors.

\* \* \* \* \*